United States Patent
Seilus et al.

(10) Patent No.: US 9,795,856 B2
(45) Date of Patent: *Oct. 24, 2017

(54) REMOVABLE ABSORBENT AND SANITARY EXERCISE EQUIPMENT COVER

(71) Applicant: CS Fitness, LLC, Bound Brook, NJ (US)

(72) Inventors: Suzanne Seilus, Bound Brook, NJ (US); Marci Crystal, Green Brook, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/130,016

(22) Filed: Apr. 15, 2016

(65) Prior Publication Data

US 2016/0303460 A1    Oct. 20, 2016

Related U.S. Application Data

(60) Provisional application No. 62/148,926, filed on Apr. 17, 2015.

(51) Int. Cl.
*A63B 71/00* (2006.01)
*B62B 5/06* (2006.01)

(52) U.S. Cl.
CPC .............. *A63B 71/00* (2013.01); *B62B 5/069* (2013.01)

(58) Field of Classification Search
CPC ............ A63B 21/4033; A63B 21/4035; A63B 21/4037; A63B 21/4039; A63B 23/03516; A63B 23/03525; A63B 23/12; A63B 23/16; A63B 71/00; A63B 71/0054; A63B 71/08; A63B 71/14; A63B 2071/0063; A63B 2071/009; A63B 2225/68; A63B 2225/687; A63B 22/00; B62K 21/26; B32B 1/08; B32B 9/02; B32B 5/18; B32B 27/36; B32B 2597/00; B32B 2555/00; A47L 13/16

See application file for complete search history.

(56) References Cited

U.S. PATENT DOCUMENTS

| | | | | |
|---|---|---|---|---|
| 4,165,555 A * | 8/1979 | Boxer | ................. | A41B 11/002 209/937 |
| 4,403,366 A * | 9/1983 | Lucke | ................ | A41D 13/0015 15/209.1 |
| 4,448,560 A * | 5/1984 | Monaco, Jr. | ........... | A63B 71/00 206/205 |
| 4,885,195 A * | 12/1989 | Change, III | ........... | A47K 10/12 401/201 |
| 6,115,872 A * | 9/2000 | Welsh | .................... | A63B 57/60 15/209.1 |
| 6,220,997 B1 | 4/2001 | Kohl | | |
| 7,322,068 B1 * | 1/2008 | Kim | ...................... | A47K 10/02 15/209.1 |

(Continued)

*Primary Examiner* — Andrew S Lo
*Assistant Examiner* — Gary D Urbiel Goldner

(57) ABSTRACT

The present invention relates generally to the field of fitness and exercise equipment. More particularly, the invention relates to an easily removable and reusable absorbent fitness and exercise equipment cover with an integrated releasably attached towel for selectively covering a portion of exercise and fitness equipment during use. The invention provides for sweat absorption, enhanced grip on handgrips, the secure safe storage of the towel, and prevents user contact with bodily fluids of other uses that may be present on a surface of the exercise and fitness equipment.

13 Claims, 4 Drawing Sheets

(56) References Cited

U.S. PATENT DOCUMENTS

| | | | |
|---|---|---|---|
| 7,955,683 B1* | 6/2011 | Ferrell | A47K 10/02 15/209.1 |
| D650,539 S * | 12/2011 | Caprarola | D32/40 |
| 8,307,489 B1* | 11/2012 | Adame | A63B 57/60 15/105 |
| D685,551 S * | 7/2013 | Myers | D32/40 |
| D685,552 S * | 7/2013 | Myers | D32/40 |
| 8,701,216 B1* | 4/2014 | Evans | A41D 19/0037 2/161.2 |
| 8,852,712 B1* | 10/2014 | Diaz | A63B 21/4037 428/100 |
| D752,162 S * | 3/2016 | Adrig | D21/694 |
| 2002/0092132 A1* | 7/2002 | Kessler | B62B 5/06 16/436 |
| 2003/0159245 A1* | 8/2003 | Harman | G09F 23/06 16/110.1 |
| 2004/0142140 A1* | 7/2004 | Halfon | B62B 5/06 428/80 |
| 2005/0194502 A1* | 9/2005 | Montgomery | F16M 13/00 248/174 |
| 2005/0217048 A1* | 10/2005 | Elie | A47K 10/02 15/209.1 |
| 2007/0099779 A1 | 5/2007 | Boehm | |
| 2008/0004168 A1* | 1/2008 | Jackson | A47C 9/002 482/148 |
| 2008/0104739 A1 | 5/2008 | Kharazmi | |
| 2008/0185083 A1* | 8/2008 | Balbosa | B62B 5/06 150/154 |
| 2008/0191434 A1* | 8/2008 | Herron | B62B 5/0013 280/33.992 |
| 2008/0303230 A1* | 12/2008 | Somberg | B62B 5/06 280/33.992 |
| 2009/0075000 A1* | 3/2009 | Draghici | B32B 3/02 428/35.2 |
| 2010/0147102 A1 | 6/2010 | Egan | |
| 2011/0114235 A1* | 5/2011 | Hartley | A63B 71/00 150/154 |
| 2012/0258274 A1 | 10/2012 | Del Sole | |
| 2012/0304382 A1 | 12/2012 | Sole | |
| 2014/0013570 A1* | 1/2014 | Livingston | A47L 13/16 29/428 |
| 2014/0068858 A1* | 3/2014 | Wambeke | A47G 9/062 5/420 |
| 2014/0178664 A1* | 6/2014 | D'Orazio | B32B 25/16 428/220 |
| 2015/0041603 A1* | 2/2015 | Kinder | A47K 10/025 248/214 |
| 2016/0059066 A1* | 3/2016 | Willis | A63B 21/1473 5/417 |

* cited by examiner

REMOVABLE ABSORBENT AND SANITARY EXERCISE EQUIPMENT COVER

This Application claims priority to Provisional U.S. Patent Application Ser. No. 62/148,926 filed on Apr. 17, 2015.

FIELD OF THE INVENTION

The present invention relates generally to the field of fitness and exercise equipment. More particularly, the invention relates to an easily removable and reusable absorbent fitness and exercise equipment cover with an integrated releasably attached towel for selectively covering a portion of exercise and fitness equipment during use. The invention provides for sweat absorption, enhanced grip on handgrips, the secure safe storage of a towel, and prevents user contact with the bodily fluids of other users that may be present on the surface of the exercise equipment.

BACKGROUND

In crowded gyms, a user may utilize a piece of exercise equipment a mere few minutes or even seconds after another user completed use of the same equipment. With such a short time interval between users, there exists a possibility for disease or bacteria transmission between users due to bodily fluids left on the exercise equipment.

In addition to the possibility of disease and/or bacteria transmission, most people find it highly unpleasant to utilize or grasp exercise equipment which is coated in sweat or other bodily fluids from another user. For these reasons, many gyms request that each user wipe down or clean exercise equipment after use. Unfortunately, such cleaning requests are seldom followed by gym users. Even in the rare instance where a user follows a gym's cleaning requests, the user's cleaning of the exercise equipment is likely ineffective and serves little to no actual cleaning value.

When exercising on a piece of gym equipment with designated handgrips, such as a stationary bike and/or stationary bike designed for group exercise, there is a very real hygiene hazard posed by perspiration buildup on the designated handgrips. In addition, designed handgrips do not absorb a user's sweat during use. Consequently, a slippage hazard due to decreased grip caused by perspiration buildup on the designated handgrips exists. This slippage hazard is most notable for stationary bikes designed for group exercise, whereon a rider often changes his or her hand position between several designed handgrips and switches between a seating and standing position, all while operating the stationary bike at a very high intensity. Furthermore, the use of a stationary bike and/or stationary bike designed for group exercise requires a high level of physical exertion, causing the user to sweat profusely, which creates uncomfortable and unsanitary conditions.

Due to these reasons, many users carry a towel when they utilize exercise equipment generally, and more specially, a stationary bike and/or stationary bike designed for group exercise. Due to the highly physical and movement centric nature of utilizing a stationary bike and/or stationary bike designed for group exercise, towels carried by users of these types of exercise equipment often fall off the stationary bike and land on the unsanitary ground, get caught in the mechanism of the stationary bike or otherwise operate as a hindrance to effective exercise. In these instances, towels carried by users become both unclean and act as a safety hazard. In addition, the mere use of a towel alone in conjunction with a stationary bike and/or stationary bike designed for group exercise does not prevent the slipping hazard created by perspiration buildup on the handgrips, sanitize the equipment, or prevent a user's own sweat from dripping onto the equipment and/or handgrips.

Therefore there exists an unmet need for a novel exercise equipment cover generally, and a novel cover for use in conjunction with a stationary bike and/or stationary bike designed for group exercise specifically, which provides for handgrip sweat absorption, increase handgrip grip and acts as a sanitary barrier between a current user's and previous user's bodily fluids, as well as providing for a fully functional removable towel that can be safely and easily stored and used by a user during his or her use of a stationary bike and/or stationary bike designed for group exercise.

Covers for exercise equipment generally are known. For example, U.S. Pat. No. 6,220,997, U.S. Patent Application Publication No. 2007/0099779 and U.S. Patent Application Publication No. 2012/0258274 disclosed covers for exercise equipment. In addition, covers relating to a stationary bike specifically are disclosed in U.S. Patent Application Publication No. 2010/0147102.

Importantly, none of the foregoing examples disclose and thus, there remains a need for, easily removable sweat absorbent exercise equipment cover with an integrated releasably attachable towel that can be used by a user while operating the exercise equipment, which provides for handgrip sweat absorption, increase handgrip grip and acts as a sanitary barrier between a current user's and previous user's bodily fluids. This unmet need is especially relevant in the field of stationary bikes and/or stationary bike designed for group exercise, as well as any other exercise equipment that comprise fixed handgrips. The present invention provides for a novel device that solves this unmet need.

SUMMARY OF THE INVENTION

The present invention provides for an easily removable, customizable sweat absorbent exercise equipment cover with an integrated releasably attached towel that provides a sanitary barrier between the current user's and prior user's bodily fluids, perspiration and bacteria residue as well as reducing perspiration build up on handgrips, thereby reducing slipping hazards, and providing for the safe storage of a towel.

DETAILED DESCRIPTION OF THE PREFERRED EMBODIMENTS

One skilled in the relevant art will recognize that the techniques described herein can be practiced without one or more of the specific details, or with other methods, components, materials, etc. to obtain similar results and/or results in specific scenarios. In other instances, well-known structures, materials or operations are not shown or described in detail to avoid obscuring certain aspects.

Reference throughout this Application to "one embodiment" or "an embodiment" means that a particular feature, structure, or characteristic described in connection with the embodiment is included in at least one embodiment of the present invention. Thus, the appearances of the phrase "in one embodiment" or "in an embodiment" in various places throughout this Application are not necessarily all referring to the same embodiment. Furthermore, the particular features, structures, or characteristics may be combined in any suitable manner in one or more embodiments.

Figure 1:
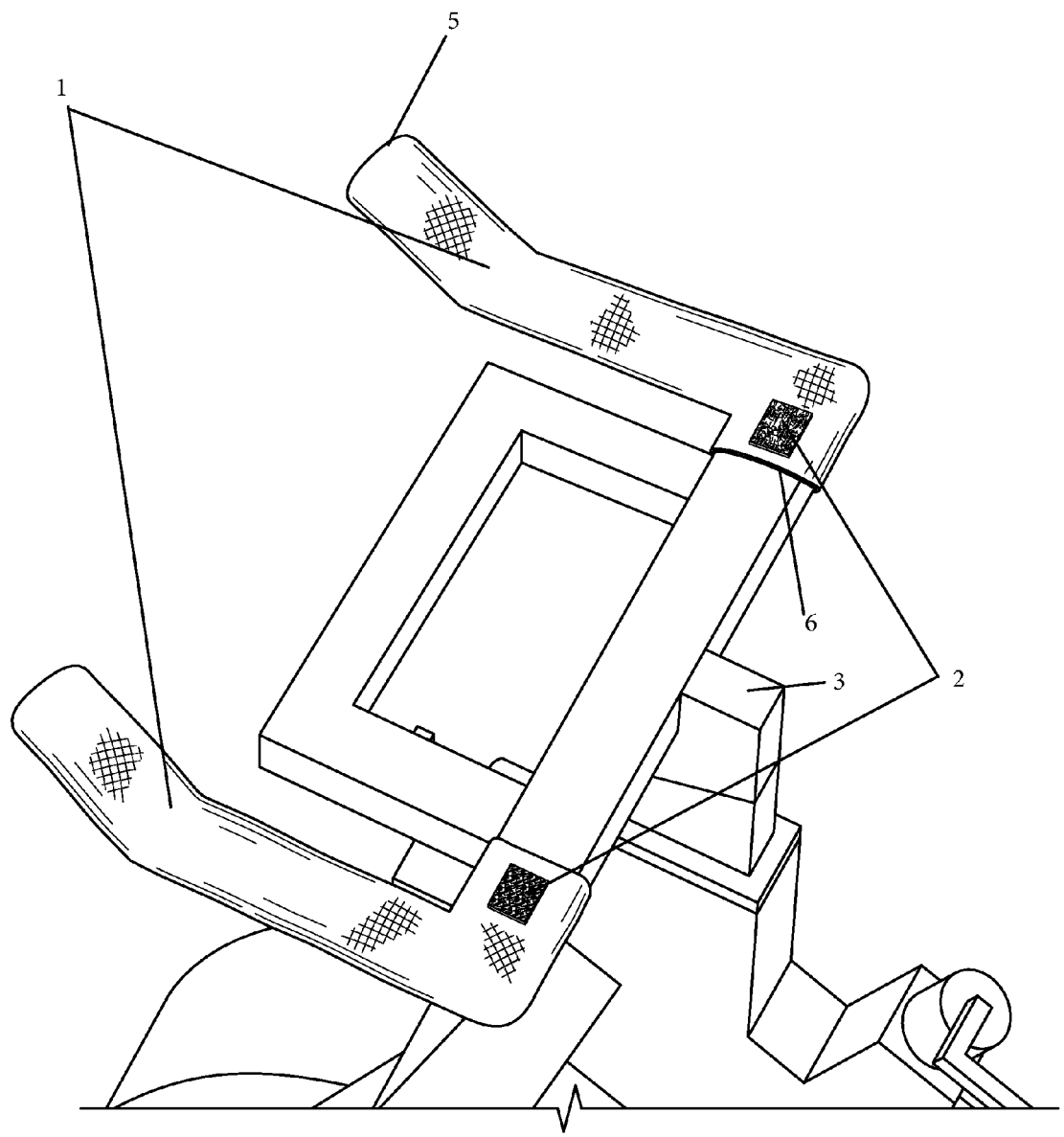
FIG. 1 is a top perspective view depicting the two the identical handgrip covers (1), with integrated releasable attachment means (2) installed on the handgrip configuration (3) typically found on a stationary bike designed for group exercise.

Turning to FIG. 1, a top perspective view depicting the handgrip configuration (3) typically found on a stationary bike designed for group exercise is shown. Two identical handgrip covers (1) with integrated releasable attachment means (2) are shown. Each identical handgrip cover is comprised of a hollow cylindrical body made of any suitable absorbent material, such as cotton or polyester, said hollow body consisting of a sealed end (5) and open mouth (6). Each identical handgrip cover further comprises an integrated releasable attachment means (2) located near the open mouth (6). Said releasable attachment means (2) may be comprised of any releasable attachment means known in the art, including any suitable hook and loop fastener such as VELCRO®, or buttons, snaps, embedded magnets and/or magnet material, or other non-permanent cloth fastener.

Figure 2:
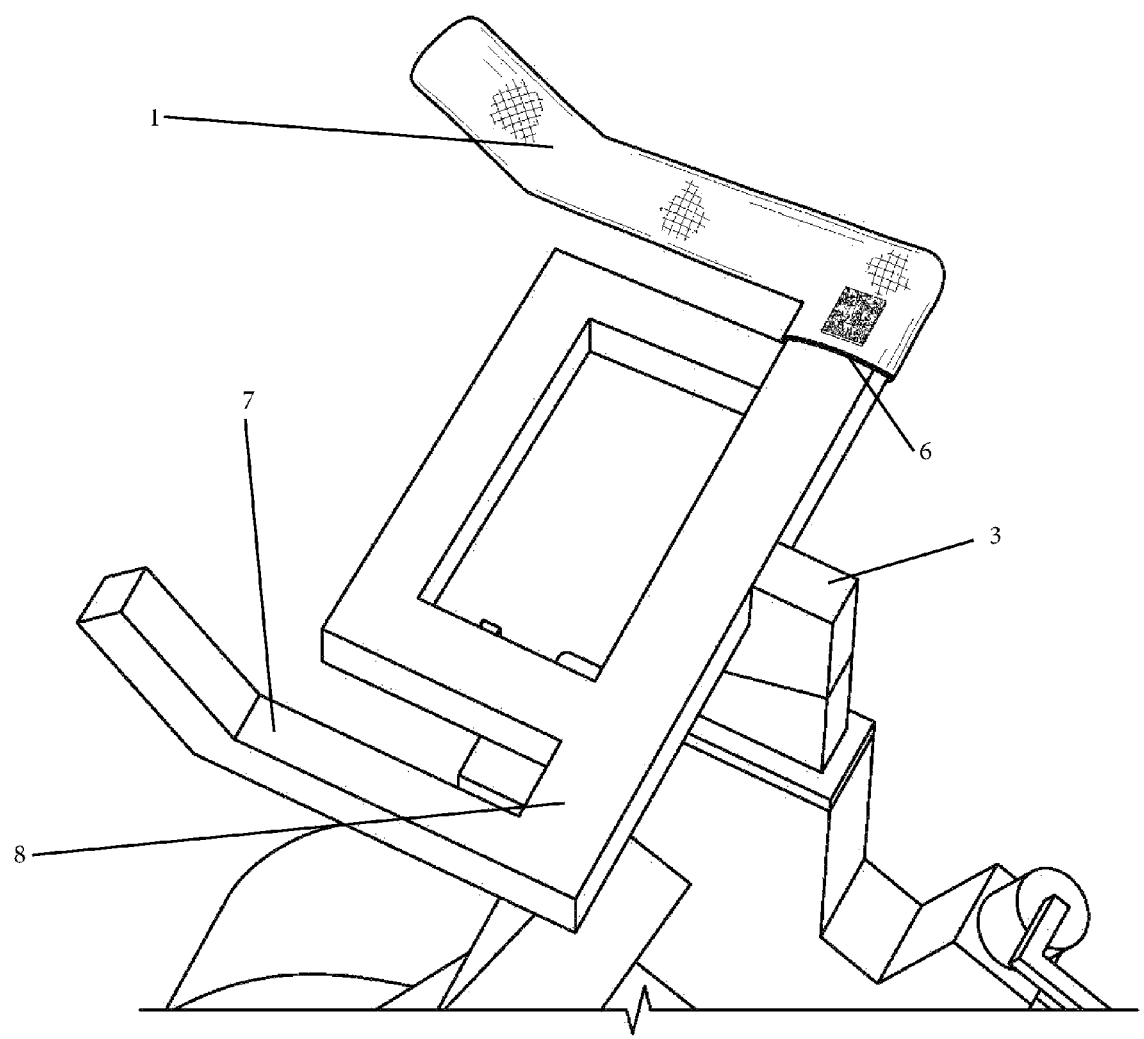
FIG. 2 is a top perspective view depicting the handgrip configuration (3) typically found on a stationary bike designed for group exercise with one of the two identical handgrip covers (1) installed on the handgrips.

Turning now to FIG. 2, a top perspective view depicting the handgrip configuration (3) typically found on a stationary bike designed for group exercise is shown. Each identical handgrip cover is configured such that one vertical outer handgrip of a stationary bike (7) can be axially inserted into the handgrip cover's hollow body through the open mouth (6) such that the handgrip cover can be pulled down along the axis of one vertical outer handgrip (7) to the base of the vertical handgrip, and then pulled horizontally along the axis of the horizontal base handgrip (8) until that the entirety of the vertical and base horizontal handgrips are covered by one of the handgrip covers. The other corresponding vertical and base horizontal handgrips of the same stationary bike would likewise be inserted into the second identical handgrip and covered in the same manner.

Figure 3:
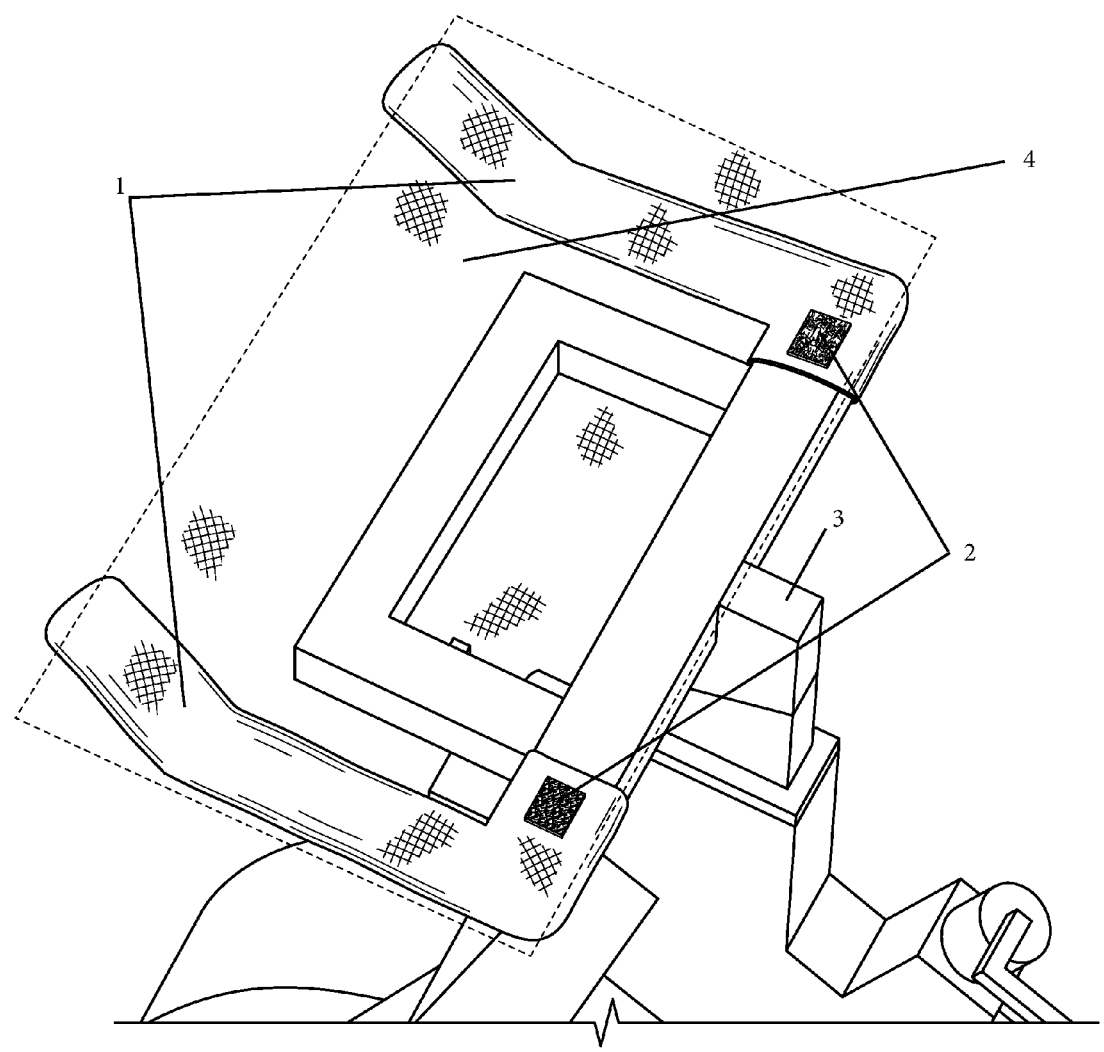
FIG. 3 is a top perspective view depicting the two the identical handgrip covers (1) installed on the handgrip configuration (3) typically found on a stationary bike designed for group exercise, with the removable towel (4) releasably attached to the two identical handgrip covers (1) via the releasable attachment means (2).

As shown in FIG. 3, the two identical handgrip covers (1) are further configured such that when the covers are installed on the stationary bike's vertical (7) and horizontal base handgrips (8), the releasable attachment means of the handgrip covers (2) spatially corresponds to the releasable attachment means (2) of the removable towel (4), thereby creating releasable attachment points between the handgrip covers (1) and the removable towel (4) which secure the towel to the handgrips. As further shown by FIG. 2, the removable towel (4) is configured such that when releasably attached to the handgrip covers (1) via the releasable attachment means (2), the removable towel (4) substantially covers all handgrips of the stationary bike, including but not limited to the vertical and base horizontal handgrips. The removable towel can be easily attached to, and removed from, the handgrip covers (1) via the releasable attachment means (2) during operation of the stationary bike by a user, thereby allowing the user to utilize the removable towel in any manner he or she deems fit, and allowing the user to quickly and easily return the towel to the handgrip covers for storage and/or additional coverage of the handgrips.

Figure 4:
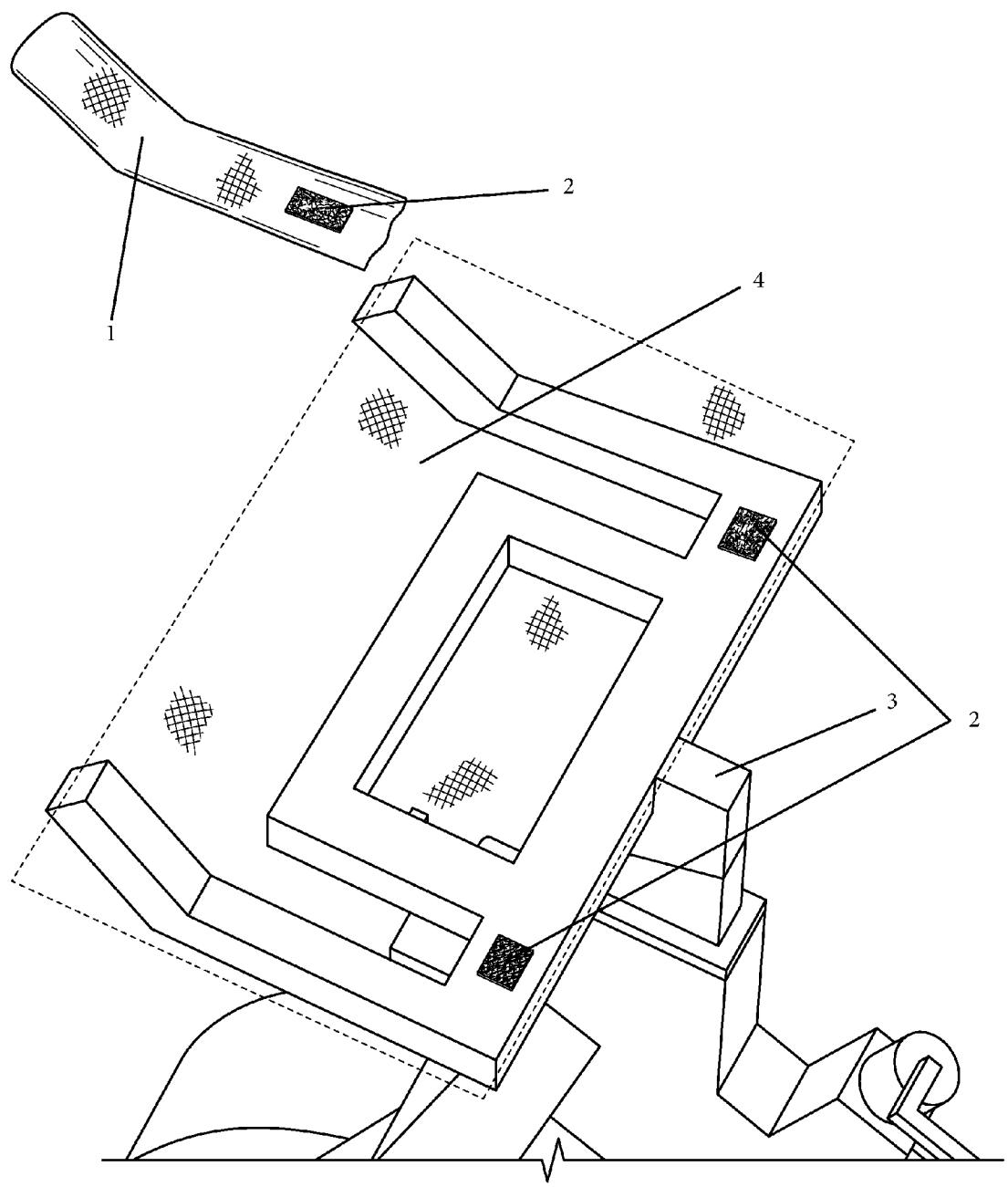
FIG. 4 is a top perspective view depicting the handgrip configuration (3) typically found on a stationary bike designed for group exercise, the removable towel (4) and the removable towel's integrated releasable attachment means (2). One of the two identical handgrips covers (1) is shown removed from stationary bike's handgrips showing an integrated releasable attachment means (2).

Looking at FIG. 4, a top perspective view depicting the handgrip configuration (3) typically found on a stationary bike designed for group exercise is shown. The removable towel (4) and the removable towel's integrated releasable attachment means (2) are also shown. One of the two identical handgrips covers (1) is shown removed from stationary bike's handgrips, showing its mouth (6) and releasable attachment means (2) for attachment to the removable towel (4) when the handgrip cover (1) is installed on the handgrips (3).

In one embodiment, each identical handgrip cover (1) measures approximately sixteen inches in length with a hollow body diameter of approximately three inches. The removable towel (4) measures approximately twenty-four inches in height by sixteen inches in width.

In an embodiment, the handgrip covers (1) and removable towel (4) may be made from any soft, washable material. However, it is contemplated that any material that provides the protective and absorbent qualities according to the goals of the invention may be utilized. In addition, the handgrip covers (1) and removable towel (4) may be made from, or incorporate any antibacterial and/or antimicrobial materials, as well as any stretchable fabrics or materials.

In an embodiment, the interior surface of the handgrip covers (1) are made from any suitable non-slip or non-skid material known in the art. According to one embodiment, the handgrip covers are capable of being affixed to any exercise equipment handgrips via the insertion of any suitably sized handgrips into the open mouth of the identical handgrip covers.

According to an embodiment, the handgrip covers (1) and/or the removable towel (4) are constructed out of an outer absorbent material, an inner absorbent material and a non-permeable barrier between the outer and inner materials to prevent any sweat residue or bacteria located on a piece of exercise equipment from reaching the outer surface of the handgrip covers or removable towel. In another embodiment, the handgrip covers (1) are constructed out of an absorbent inner material and a neoprene outer material.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

Each and every feature described herein, and each and every combination of two or more of such features, is included within the scope of the present invention provided that the features included in such a combination are not mutually exclusive.

What is claimed is:

1. A protective covering device for exercise equipment including a pair of generally opposing handgrips, the protective covering device comprising:
    two identical hollow cylindrical handgrip covers, each of the covers having a first integrated releasable attachment means, each of the covers being configured to be receive one of the handgrips therein; and a towel having a second integrated releasable attachment means, the towel being releasably securable to the handgrip covers when the first integrated releasable attachment means engages the second integrated attachment means, the covers remaining secured to the handgrips when the first integrated attachment means is disengaged from the second integrated attachment means.

2. The device of claim 1 wherein each handgrip cover measures approximately sixteen inches in length with a diameter of approximately three inches.

3. The device of claim 1 wherein the towel measures approximately twenty-four inches in height by sixteen inches in width.

4. The device of claim 1 wherein each handgrip cover measures approximately sixteen inches in length with a diameter of approximately three inches and the towel measures approximately twenty-four inches in height by sixteen inches in width.

5. The device of claim 1 wherein the first and second releasable attachment means are comprised of a hook and loop fastener.

6. The device of claim 1 wherein the first and second releasable attachment means are comprised of one of the following attachment means: buttons, snaps, embedded magnets, magnet material.

7. The device of claim 1 wherein the handgrip covers and the towel are made from any suitable material.

8. The device of claim 1 wherein the handgrip covers are made from a cotton or polyester.

9. The device of claim 1 wherein the handgrip covers are made from a combination of polyester and neoprene.

10. The device of claim 1 wherein the handgrip covers are comprised of an outer neoprene layer and an inner absorbent layer.

11. The device of claim 1 wherein the handgrip covers and the towel are made from cotton or polyester.

12. The device of claim 1 wherein the handgrip covers and the towel further comprise antibacterial and/or antimicrobial materials.

13. The device of claim 1 wherein the handgrip covers and the towel are comprised of an outer absorbent layer, an inner absorbent layer, and a middle non-permeable layer.

* * * * *